Nov. 7, 1933.                    E. R. DAVIS                    1,933,844
                                BUOYANT DECOY
                    Filed Aug. 13, 1932          2 Sheets-Sheet 1
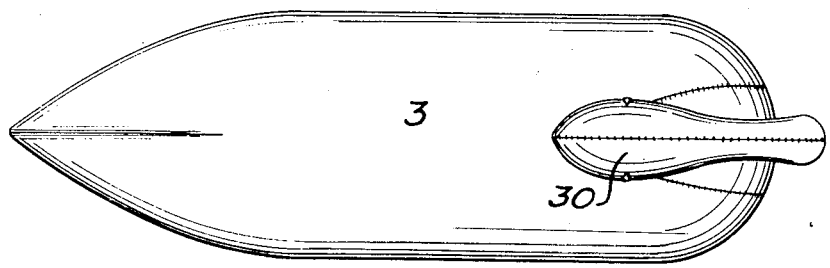
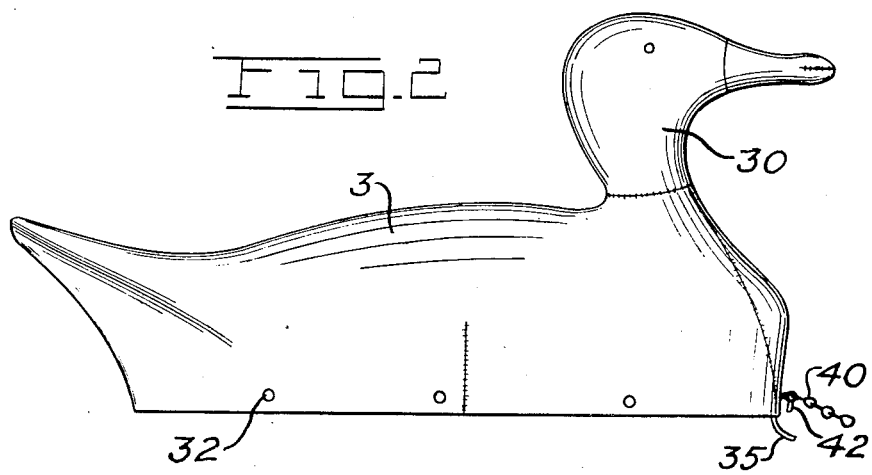
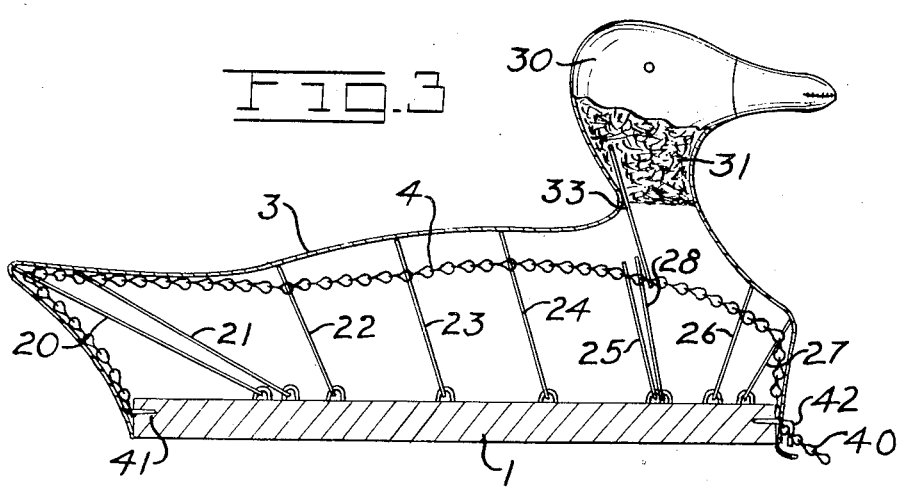
INVENTOR
Edwin R. Davis
BY
Charles L. Reynolds
ATTORNEY Nov. 7, 1933.  E. R. DAVIS  1,933,844
BUOYANT DECOY
Filed Aug. 13, 1932   2 Sheets-Sheet 2
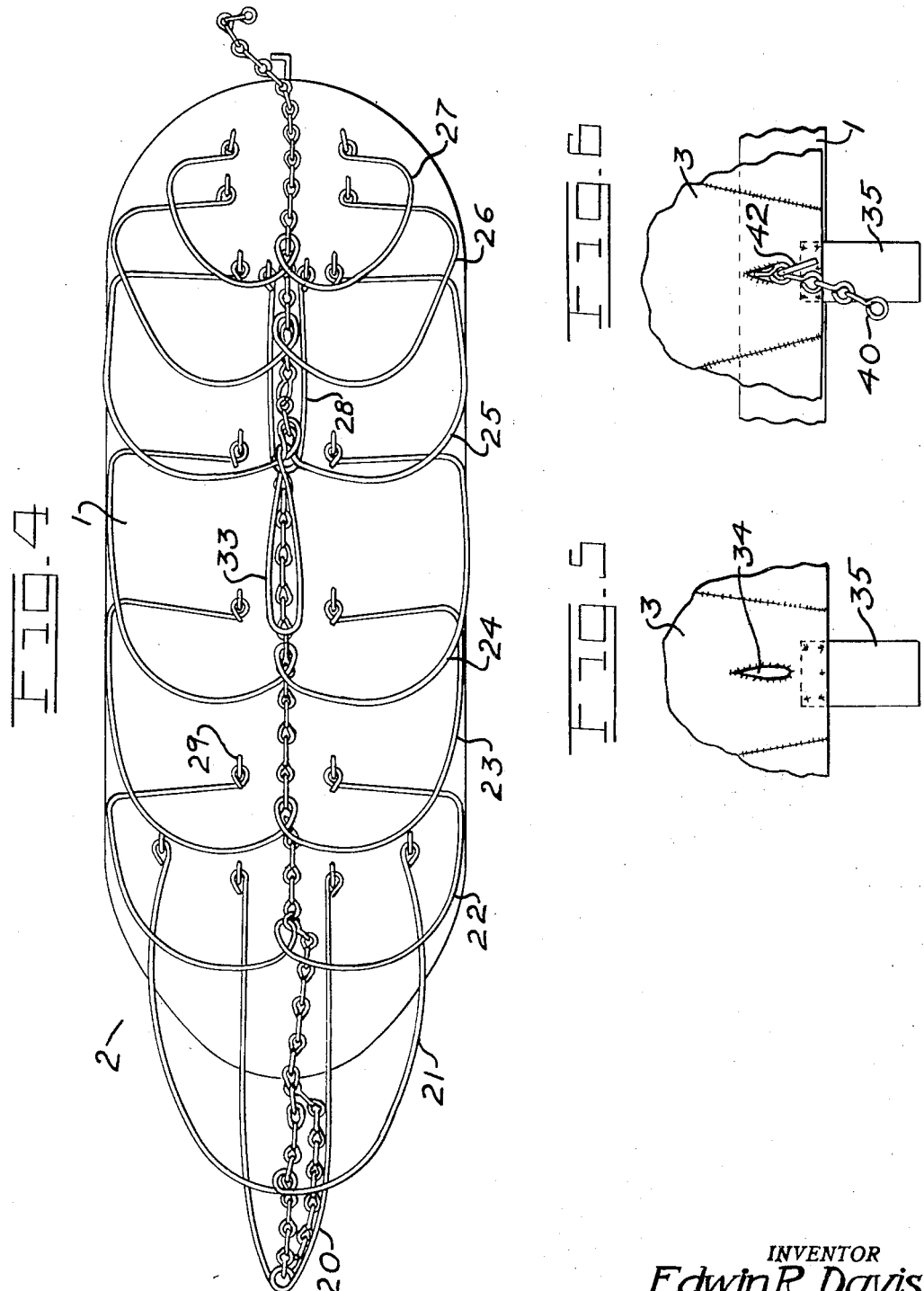
INVENTOR
Edwin R. Davis
BY Charles L. Reynolds
ATTORNEY Patented Nov. 7, 1933

1,933,844

UNITED STATES PATENT OFFICE 1,933,844

BUOYANT DECOY

Edwin R. Davis, near Seattle, Wash.

Application August 13, 1932. Serial No. 628,703

6 Claims. (Cl. 43—3)

My invention relates to a floating decoy for game birds, for instance, a decoy in the form of a duck or goose.

Hunters must carry a number of such decoys, sometimes considerable distances over difficult ground, and it is therefore desirable that they be collapsible, and as light as possible, yet they must be strong and ruggedly made to stand the type of handling to which they are subject. Not only must they be buoyant, but they must have such characteristics that if they are upset or submerged they will naturally right themselves and again float upright, yet they should not be weighted to ballast them; rather the weight should be kept down. They must be inexpensive to make, yet offer a good simulation of the bird they are intended to represent.

It is the main object of my invention to provide a decoy having the characteristics outlined above.

With these and other objects in mind, as will hereafter appear, my invention comprises the novel parts and the novel combination and arrangement thereof, as shown in the accompanying drawings, described in this specification, and as will be more particularly defined by the claims which terminate the same.

In the accompanying drawings I have shown my invention embodied in an illustrative form as now preferred by me, it being understood that the principles of the invention may be embodied in other forms, and that changes may be made in the form and shape of the invention within those principles as defined by the claims.

Figure 1 is a plan view, and Figure 2 a side elevation, of a decoy duck made according to my invention, the markings being omitted.

Figure 3 is a longitudinal vertical sectional view through such a decoy.

Figure 4 is a plan view of the upper side of the decoy, with the cover omitted and with parts in the collapsed position.

Figure 5 is a fragmentary front elevation of a portion of the cover, and Figure 6 is a similar view showing the same associated with the base.

The decoy is made of three principal elements, the base 1, the collapsible frame, generally designated by the numeral 2, and the cover 3. The base is made in any convenient manner to be buoyant, and preferably is substantially flat on top and bottom, and comparatively broad and long. Thus the base may be made of a common board, suitably painted to protect it and prevent its becoming water-logged. Its outline simulates the general outline of a duck or other water fowl at the water line.

Supported upon the upper side of the buoyant base 1 is the collapsible frame 2. This may assume various forms, and the individual members thereof may be so constructed as to make the frame as a whole to simulate different water fowls, but in general it is composed of a plurality of rib members 20, 21, 22, 23, 24, 25, 26 and 27 (see Figures 3 and 4). The number and the shape of these may vary widely. These rib members are placed transversely of the base 1, and are hingedly supported to swing upon a transverse axis. This may be accomplished by the staples 29 received in eyes at the ends of the wires forming the individual rib members, and driven into the upper surface of the base 1.

I prefer that the staples 29 be arranged not adjacent the side edges of the base 1, but preferably slightly spaced from the longitudinal center line of the base. Thus each of the rib members, with the exception of the members 20 and 21, as herein shown, extends from the staple 29 at one side outwardly to the edge of the base 1, thence up and over the base and downwardly to the opposite edge of the base, and thence inwardly to the second staple 29, which is opposite the first. This provides a certain amount of movement between the frame 2, composed of the individual rib members, and the base, and this assists in starting and returning the decoy to an upright position if it falls in the water or on its side, or is knocked over.

To move the frame 2 into upright or operative position means are provided so that the individual members can be moved from position collapsed upon the base 1, as they are seen in Figure 4, into a position where they extend upwardly over the base, as seen in Figure 3. Preferably a single means accomplishes this end for all the rib members, and to this end I have shown a flexible chain 4 which is secured at 41 to the base, this point being preferably at the tail end of the base, thence it extends upwardly to the rib member 20, and in turn to the several rib members, spacing them accurately, and a free end 40 is left by means of which the chain can be secured to the forward end of the base, thus to hold all the rib members in upright or operative position. As a simple means of accomplishing this I have shown a hook 42 which is secured in the forward end of the base 1, and which will engage within a link of the chain 40, and which can then be turned to prevent disengagement of the chain therefrom.

It will be observed in Figure 3 that the majority of the rib members are somewhat inclined rearwardly when in operative position, though the rib members 26 and 27 incline forwardly. However, these are small and comparatively light members, and the tendency of the entire frame, when the end 40 of the chain is released from the hook 42, is to fall rearwardly, and thus to collapse upon the base 1.

Fitted over the frame 2 is the cover 3, and the main portion of this cover simulates the body of a water fowl. The cover is likewise formed to simulate a head 30, and I prefer that this head be stuffed with suitable material, for instance, horsehair, as indicated at 31. This stuffing may be left open to the interior of the cover, and should be of a character that it will not fall through the restricted opening at the junction of the neck with the body portion. To support this head upright I may provide an extra member 28, which in effect is part of the frame, and which carries a prong 33 at its upper end, which can be projected into the stuffing of the head, thus to hold the head upright. The member 28 is pivotally supported from the base 1 in substantially the same manner as already described, and the chain 4 may be connected to this member in the same manner as it is connected to the other frame or rib members, so that the member 28 collapses and is moved upright with the remainder of the frame.

The cover 3 must be of such size and shape that it engages the base 1, at least the edges thereof. It may or may not be secured at the edge of the base. If it is secured, the securing means may be permanent, or they may be tacks or thumb tacks, as indicated at 32.

Preferably the cover is of water-proof material, for instance, water-proof duck, and while it may not be perfectly tight about the base, yet the space within it, as formed by the frame 2, constitutes an air chamber of considerably greater volume and buoyancy than the base 1. Thus, while the base is not an added weight, and therefore is not objectionable to the hunter who must carry it, yet the air chamber, when the decoy is set up, constitutes a greater buoy, and is of such shape that it will tend to tilt the base 1, should the base be placed edgewise in the water or upside down. The result will be that no matter in what position the decoy may be thrown or may find itself in the water the air trapped within the cover 3 will tend to bring it to the surface, and will tend to come uppermost, thereby tilting the buoyant base 1 until this base, of its own buoyance, tends to float upright. This action will occur so rapidly that the trapped air will not have time to escape.

The cover 3 may be secured to the base, temporarily or permanently, at the rear end and along the sides, but it must be releasable from the forward end to permit collapsing properly, and in order to permit this, and to hold it securely when it is set up, I may provide a buttonhole 34 or a like aperture in position to register with the hook 42. Thus after the hook has been engaged with the end 40 of the chain the hole 34 may be brought down over the hook, and then when the hook is turned downward not only is the frame 2 held upraised and in operative position, but the cover 3 is likewise so held. To assist in engaging the buttonhole over the hook I may provide a finger tab 35, below this buttonhole and secured to the cover.

What I claim as my invention is:

1. A floating game decoy comprising a buoyant base, a cover disposed above and engaged with the base to form an air chamber above the base of greater buoyancy than the base, and a plurality of transverse rib members hingedly supported upon the upper side of said base, and movable to permit collapse of said cover upon the base.

2. A floating game decoy comprising a buoyant flat-bottomed base, a collapsible frame supported on the upper side of said base, means including a member operable when tensioned to maintain said frame in operative position, and a cover fitted over the frame and engaging the base to form, when the frame is in operative position, an air chamber above the base.

3. A floating game decoy comprising a broad buoyant base, a plurality of transverse rib members hingedly supported on the upper side of said base, and together constituting a collapsible frame, a tension member connecting the several rib members for simultaneous movement between operative and collapsed position, means to maintain the frame in operative position, and a cover fitted over the frame and engaging the base to form, when the frame is in operative position, an air chamber above the base.

4. A floating game decoy comprising a buoyant base, a plurality of transverse rib members hingedly connected to said base, a chain or the like secured to each of said rib members and at the tail end being secured to the base, to maintain the majority of the rib members always inclined rearwardly, means to releasably secure the chain to the forward end of the base, to maintain the rib members in upraised position, and a cover fitted over the several rib members and engaging the base to form, when the rib members are upraised, an air chamber above the base of larger volume than the volume of the base.

5. A floating game decoy comprising a buoyant base substantially flat at top and bottom, a plurality of wire rib members extending from a point adjacent the longitudinal center line of the base outwardly to its edge, thence in a bow to the opposite side of the base, and thence inwardly to a point opposite the first, means hingedly supporting said rib members at the first and last points to permit their collapse upon the top of the base, means to swing said rib members upright into operative position, and a cover fitted over the several rib members and engaging the sides of the base.

6. A floating game decoy as in claim 3, the cover having a stuffed head projecting above its general contour, and one of the rib members having a prong projecting in position to enter said head, and to uphold the same when the frame is in operative position.

EDWIN R. DAVIS.